April 7, 1925.
H. W. BREWER
PORTABLE MILLING MACHINE
Filed June 28, 1924   2 Sheets-Sheet 2
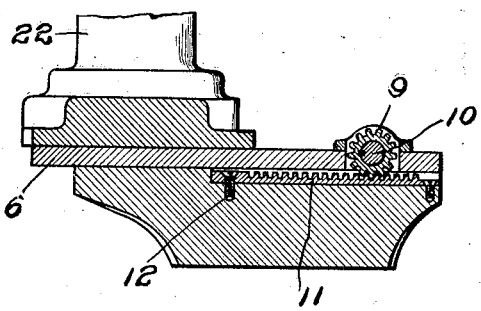
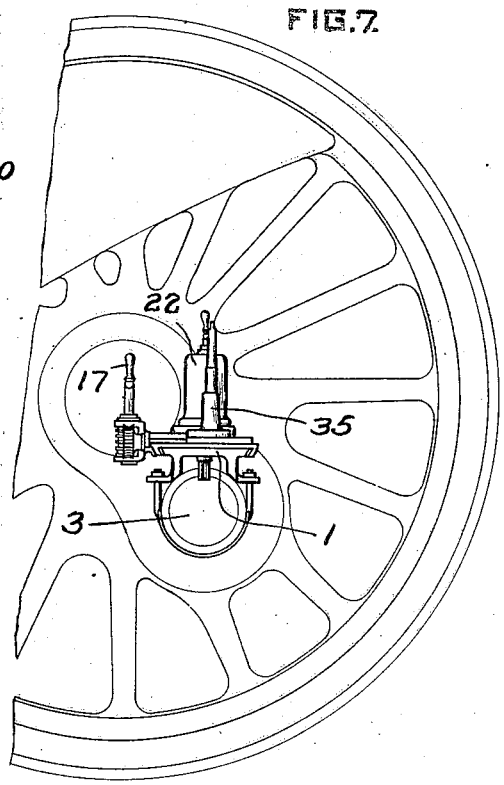
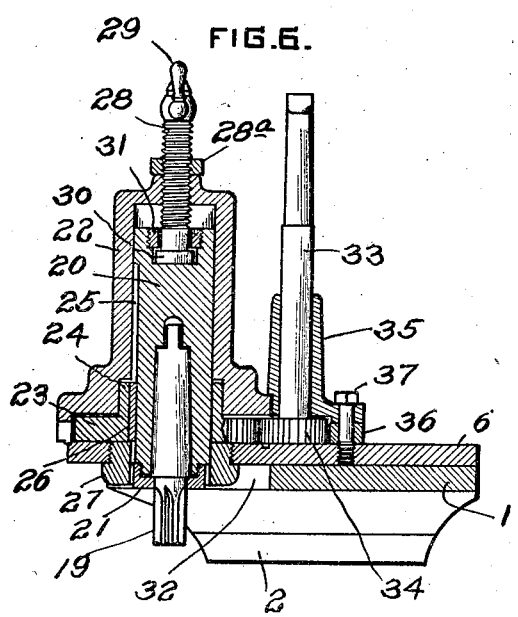
INVENTOR.
H. W. Brewer
BY James C. Bradley
ATTORNEY Patented Apr. 7, 1925.

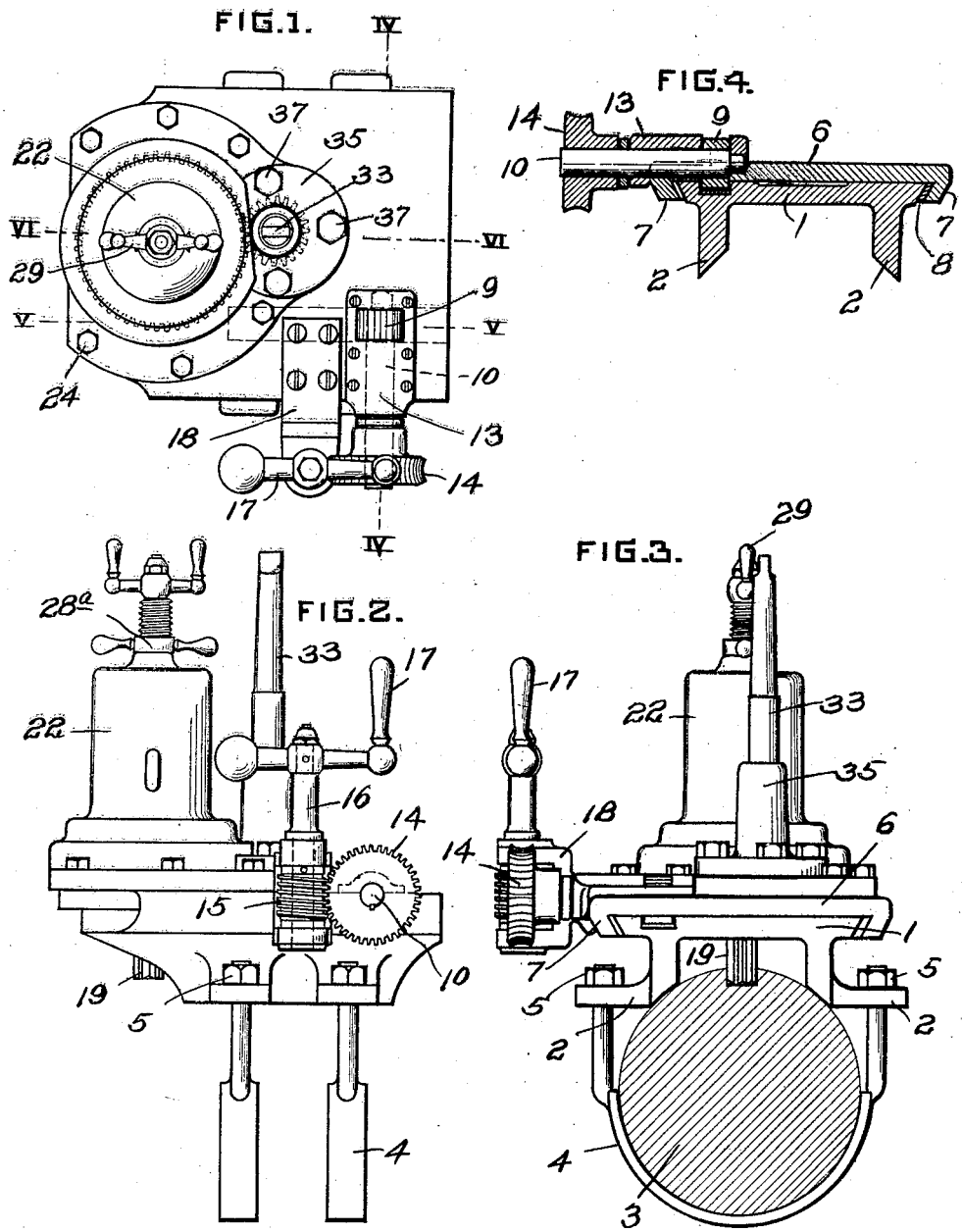

1,532,650

UNITED STATES PATENT OFFICE.

HUMPHRIES W. BREWER, OF DU BOIS, PENNSYLVANIA.

PORTABLE MILLING MACHINE.

Application filed June 28, 1924. Serial No. 722,963.

*To all whom it may concern:*

Be it known that I, HUMPHRIES W. BREWER, a citizen of the United States, and a resident of Du Bois, in the county of Clearfield and State of Pennsylvania, have made a new and useful invention in Improvements in a Portable Milling Machine, of which the following is a specification.

The invention relates to portable milling machines, and more particularly to machines for milling the keyways or key seats in locomotive crank pins, although not restricted to use in this relation. Machines for performing this function have heretofore been designed, but have been relatively cumbersome and expensive; and it is the purpose of the present invention to provide a machine of very compact and simple design, having a minimum number of parts, and of inexpensive construction, which is at the same time of convenient positive operation and durable construction. One embodiment of the invention is illustrated in the accompanying drawings wherein:

Figure 1 is a plan view of the machine. Fig. 2 is a side elevation. Fig. 3 is an end elevation with the machine clamped in position upon a crank pin in which a keyway is to be cut. Fig. 4 is a section on the line IV—IV of Fig. 1. Fig. 5 is a section on the line V—V of Fig. 1. Fig. 6 is a section on the line VI—VI of Fig. 1. And Fig. 7 is an end elevation showing the wheel with the crank pin in place and the machine mounted upon it in position of use.

Referring to the drawings, 1 is the base member provided with the ribs 2, 2 beveled, as indicated in Fig. 2, to fit the curvature of the crank pin 3 in which a slot is to be milled. This base member is held in position upon the crank pin by means of the straps 4, 4 threaded at their ends and provided with the nuts 5, 5.

Mounted upon the base plate for reciprocatory movement thereon is the slide plate 6 having the undercut flanges 7, 7 which fit around the beveled side edges of the base plate, as indicated in Figs. 3 and 4. Removable strips or shims 8 are employed in order to take up wear and provide for adjustment. The plate 6 carries the milling cutter and the parts for driving and adjusting it, as hereinafter described.

The slide plate is reciprocated by means of the pinion 9 mounted on the horizontal shaft 10, and engaging the rack 11 (Fig. 5), such rack being seated in a slot in the upper face of the base plate and held in position by the machine screws 12. The shaft is supported by the slide plate and the cover member 13, as indicated in Figs. 1 and 4, and carries at its outer end the worm wheel 14. The worm wheel is engaged by the worm 15 carried upon the vertical shaft 16, such shaft having the turning handle 17, and being journalled in the yoke 18, bolted to the top of the slide plate as indicated in Fig. 1.

The mounting of the milling cutter or tool 19 will be seen by reference to Fig. 6. The tool is carried by the spindle 20 and held in position by the nut 21 threaded onto the end of the spindle. The spindle is mounted for rotation and also longitudinal movement in the casing 22, such casing acting as a housing for the spindle and for the spur gear 23, and also as a journal box for such parts. The base of the casing is shaped so as to fit around the gear 23 and its hub 24, and is clamped to the slide plate 6 by means of the bolts 24. The spindle also has a keyway 25 and this is engaged by the key or spline 26 carried by the hub of the gear, thus permitting of the vertical adjustment of the spindle through the gear. The extreme lower end of the spindle is also journalled in the bushing 27 screwed into the slide plate from beneath.

The vertical adjustment of the spindle and its tool is accomplished by means of the screw 28 threaded through the top of the casing 22 and provided with the operating handle 29. The lower end of the screw is swivelled to the end of the spindle by means of the head 30 lying beneath the collar 31 threaded into the top of the spindle. The screw 28 is locked in adjusted position by the nut 28ª. The cutter 19 and bushing 27 project downwardly into the slot 32 (Fig. 6) in the end of the base plate between the ribs 2, 2, thus providing the necessary clearance as the slide plate is moved longitudinally during the cutting of a keyway of the desired length in the crank pin 3.

The gear 23, with the tool spindle 20 splined thereto, is rotated from a vertical operating spindle 33 adjacent thereto and provided at its lower end with a pinion 34 meshing with such gear 23. This spindle 33 is journalled in the casing 35, which with the spacer 36, constitutes a housing for the spindle and pinion, the casing being secured to the slide plate 6 by means of the bolts 37. The shank of the spindle is tapered in the same manner as the shanks of drills, reamers, etc., so as to fit the socket of the driving sleeve or element of a pneumatic or other suitable motor.

In operation, the machine is positioned upon the crank pin to be milled as indicated in Fig. 3 with the cutter 19 in its proper position radially with respect to the crank pin, the cutter being adjusted vertically by means of the handle 29 so as to cut a groove of exactly the depth desired. The motor is then applied to the shank of the spindle 33 to rotate the cutter, and during the cutting operation, the handle 17 upon the shaft 16 is rotated slowly to feed the slide plate 6 longitudinally of the base plate 1, this feed being accomplished by the rack and pinion 11 and 9 and the worm and worm wheel 15 and 14.

It will be noted that the construction, as described and illustrated, is very compact and simple and that it requires a limited number of parts. Also, that the machine is very readily assembled and disassembled for replacements or repairs. The parts 22 and 35, act, not only as housings for the spindles and gears, but also as journal boxes, the spindles and gears being thus very effectively supported and protected at a low cost, and in a manner which gives most convenient access to all the wearing parts by merely removing the stud bolts which secure the bases of the casings to the slide plate. This method of mounting the slide plate 6 and operating it, including the dove tail interlocking engagement and the rack and pinion is also advantageous because of its low cost, positive operation and rigidity. Other advantages incident to the construction will be apparent to those skilled in the art.

What I claim is:

1. In combination in a portable milling machine, a base plate or member, a slide plate interlocking with the base plate and mounted for reciprocation thereon, a vertical tool spindle mounted on the slide plate and carrying a downwardly projecting milling cutter, an upright casing bolted upon the slide plate in which the spindle is mounted for vertical movement and for a movement of rotation, a screw adjusting member mounted in the casing and swivelled to the upper end of the spindle, a second vertical drive spindle carried by the slide plate, gearing intermediate the two spindles, a third manually operable vertical spindle upon the slide plate, a horizontal shaft on the slide plate, gearing between such third spindle and said shaft, and interengaging means on said shaft and the base plate, whereby the rotation of the shaft from its operating spindle moves the slide plate along the base plate.

2. In combination in a portable milling machine, a base plate or member, a slide plate interlocking with the base plate and mounted for reciprocation thereon, a vertical tool spindle mounted on the slide plate and carrying a downwardly projecting milling cutter, an upright casing bolted upon the slide plate in which the spindle is mounted for a movement of rotation, a screw adjusting member mounted in the casing and swivelled to the upper end of the spindle, a spur gear supported for rotation between the slide plate and said casing in which the spindle is splined and having a hub journalled in the lower end of said casing, a vertical drive spindle at one side of the tool spindle provided at its lower end with a pinion meshing with said spur gear, a combined housing and bearing surrounding the pinion and operating spindle and bolted to the slide plate, and means for reciprocating the slide plate.

3. In combination in a portable milling machine, a base plate or member, a slide plate interlocking with the base plate and mounted for reciprocation thereon, a vertical tool spindle mounted on the slide plate and carrying a downwardly projecting milling cutter, an upright casing bolted upon the slide plate in which the spindle is mounted for vertical movement and for a movement of rotation, a screw adjusting member mounted in the casing and swivelled to the upper end of the spindle, a spur gear supported for rotation between the slide plate and said casing in which the spindle is splined, a bushing for the lower end of the spindle screwed into the slide plate from the lower side thereof, a vertical drive spindle journalled at one side of the tool spindle and provided with a pinion meshing with said spur gear, and means for reciprocating the slide plate.

4. In combination in a milling machine, a base plate or member slotted inward from one end and having a longitudinal groove in its upper face, a slide plate mounted for reciprocating movement longitudinally of the base plate and provided with a vertical milling cutter extending downward through the slotted end of the base plate, means carried by the slide plate for rotating the cutter and adjusting it vertically, an upwardly facing rack secured in said groove in the base plate, a horizontal shaft journalled on the slide plate and extending transversely of the rack, a worm wheel on the shaft, a vertical operating shaft carried by the slide plate and provided with a worm engaging said worm wheel, and a pinion on the horizontal shaft engaging said rack.

In testimony whereof, I have hereunto subscribed my name this 26th day of June, 1924.

H. W. BREWER.